U S 0 0 9 2 7 9 4 7 0 B 2

US009279470B2

(12) United States Patent
Ikeda

(10) Patent No.: US 9,279,470 B2
(45) Date of Patent: Mar. 8, 2016

(54) FRONT FORK

(71) Applicant: Showa Corporation, Gyoda-shi (JP)

(72) Inventor: Daisuke Ikeda, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/466,759

(22) Filed: Aug. 22, 2014

(65) Prior Publication Data
US 2015/0211595 A1    Jul. 30, 2015

(30) Foreign Application Priority Data
Jan. 27, 2014   (JP) ................................. 2014-012711

(51) Int. Cl.
| | |
|---|---|
| *F16F 9/34* | (2006.01) |
| *F16F 9/18* | (2006.01) |
| *B62K 25/08* | (2006.01) |
| *F16F 9/32* | (2006.01) |
| *F16F 9/342* | (2006.01) |
| *F16F 9/46* | (2006.01) |
| *B62K 25/04* | (2006.01) |

(52) U.S. Cl.
CPC . *F16F 9/34* (2013.01); *B62K 25/08* (2013.01); *F16F 9/185* (2013.01); *F16F 9/3257* (2013.01); *F16F 9/342* (2013.01); *F16F 9/466* (2013.01); *B62K 2025/048* (2013.01)

(58) Field of Classification Search
CPC ............. F16F 9/325; F16F 9/34; F16F 9/348; F16F 9/3484; F16F 9/44; F16F 9/446; F16F 9/185; F16F 9/3257; F16F 9/342; F16F 9/466; B62K 25/08; B62K 2025/048

USPC ............. 188/314–316, 322.13, 322.14, 322.2
See application file for complete search history.

(56) References Cited

U.S. PATENT DOCUMENTS

| 6,119,829 A | 9/2000 | Nakadate | |
|---|---|---|---|
| 8,469,162 B2 * | 6/2013 | Nishimura et al. | ........ 188/266.2 |

(Continued)

FOREIGN PATENT DOCUMENTS

| EP | 2110300 A | 10/2009 |
|---|---|---|
| EP | 2270355 A | 1/2011 |

(Continued)

OTHER PUBLICATIONS

Extended European Search Report mailed Jan. 22, 2016 for the corresponding European Application No. 14182691.7.

*Primary Examiner* — Vishal Sahni
(74) *Attorney, Agent, or Firm* — Leason Ellis LLP

(57) ABSTRACT

A front fork includes an inner cylinder disposed inside an inner tube, a piston rod moving with an outer tube, a piston attached to a lower end portion of the piston rod and sectioning an oil chamber in the inner cylinder into a lower oil chamber and an upper oil chamber and a damping force generating portion at an outside of the inner tube having a first damping force generating portion generating resistance in working oil flowing in one direction in an external flow path, a second damping force generating portion disposed in series with the first damping force generating portion in the external flow path to generate resistance in working oil flowing in the other direction, and a pressurization portion having an oil reservoir chamber communicated to an intermediate oil chamber and pressurizing working oil in the intermediate oil chamber.

9 Claims, 9 Drawing Sheets

(56) References Cited

U.S. PATENT DOCUMENTS

| | | | |
|---|---|---|---|
| 8,813,923 B2 * | 8/2014 | Lun | 188/315 |
| 8,899,391 B2 * | 12/2014 | Yamasaki et al. | 188/322.2 |
| 8,973,726 B2 * | 3/2015 | Tsukahara et al. | 188/315 |
| 8,991,571 B2 * | 3/2015 | Murakami | 188/289 |
| 2006/0054435 A1 * | 3/2006 | Yamaguchi | 188/314 |
| 2010/0326780 A1 * | 12/2010 | Murakami | 188/322.13 |

FOREIGN PATENT DOCUMENTS

| | | |
|---|---|---|
| JP | 3646228 B | 5/2005 |
| JP | 4055023 B | 3/2008 |
| JP | 2011-012806 A | 1/2011 |
| JP | 2011-027255 A | 2/2011 |
| JP | 2012-092944 A | 5/2012 |
| WO | WO-2008/085097 A | 7/2008 |

\* cited by examiner

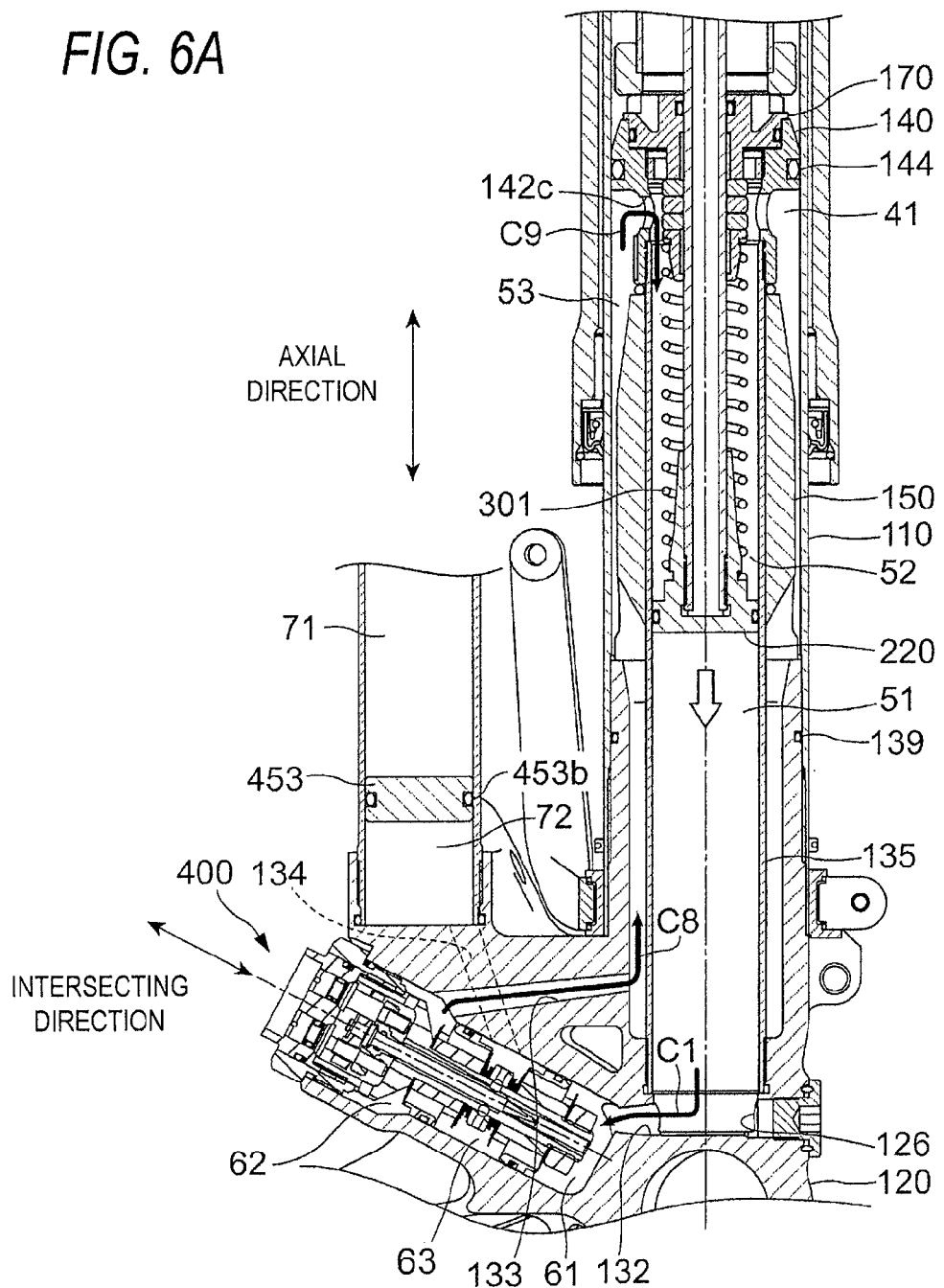

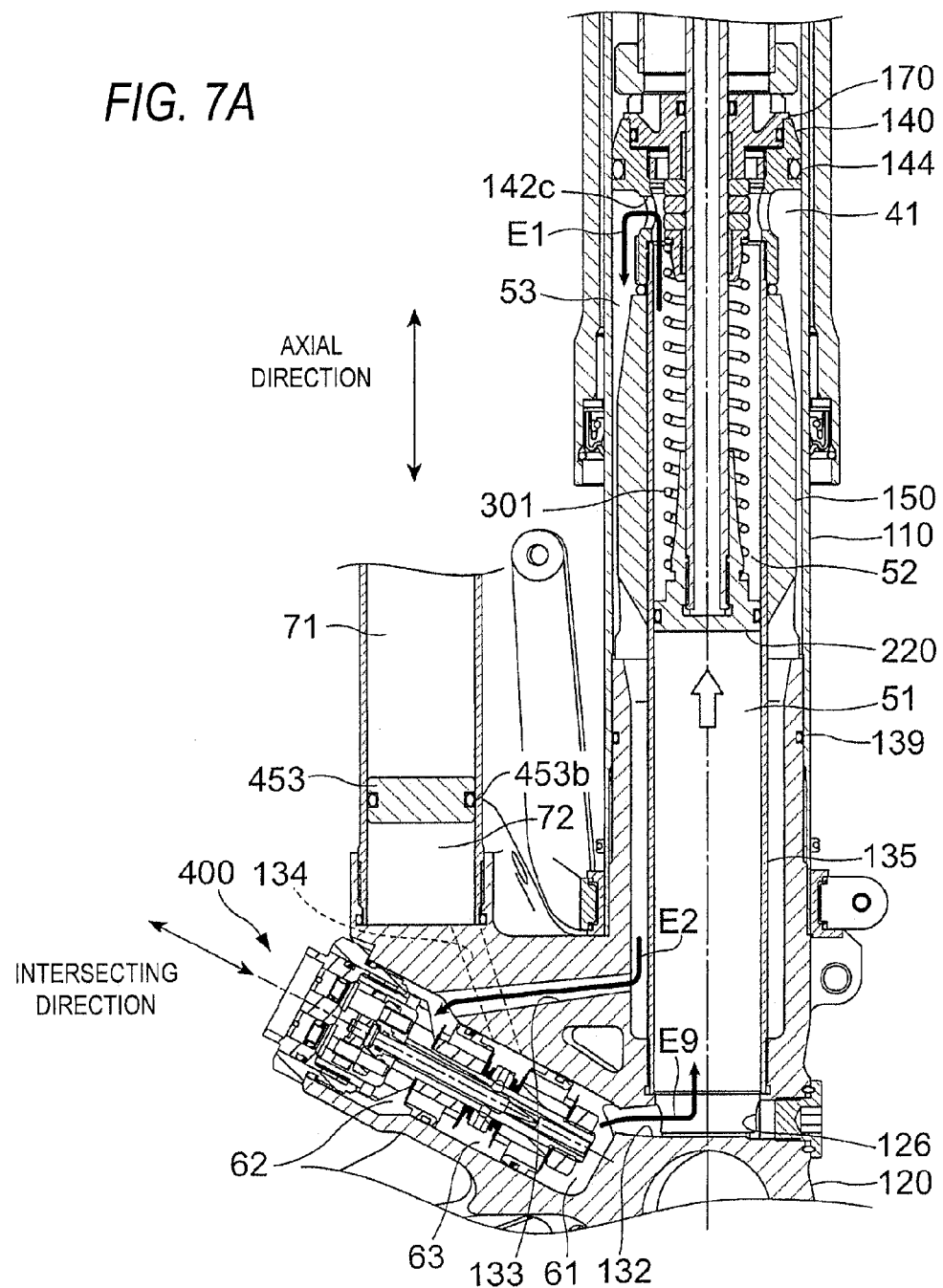

FRONT FORK

CROSS-REFERENCE TO RELATED APPLICATIONS

This application is based on and claims priority under 35 USC 119 from Japanese Patent Application No. 2014-012711 filed on Jan. 27, 2014, the entire content of which is incorporated herein by reference.

BACKGROUND OF THE INVENTION

1. Technical Field

The present invention relates to a front fork arranged between a vehicle body and a wheel of a motorcycle and so on.

2. Related Art

There is proposed, in related art, an apparatus as a front fork applied to vehicles such as a motorcycle, in which a flow path is formed in a piston moving in an axial direction of a cylinder and oil (working oil) is circulated in the flow path to thereby obtain damping force.

For example, there is disclosed, in Patent Literature 1 (JP-A-2012-92944), a front fork in which a piston device includes two pistons which are a first piston and a second piston respectively provided in two positions along an axial direction of a piston rod, the first piston defines a first main oil chamber between the first piston and a first rod guide, the second piston defines a second main oil chamber between the second piston and a second rod guide, and an intermediate chamber sandwiched by the first piston and the second piston is provided in the cylinder and is always communicated to a reservoir.

SUMMARY OF THE INVENTION

When pressure balance and friction vary in accordance with a piston speed, damping specifications and an air-chamber pressure, there is concern that a feeling of damping force becomes worse, and that riding comfort and driving stability of a vehicle are deteriorated. Accordingly, it is desirable that the feeling of damping force of the front fork is improved for improving the riding comfort and driving stability of the vehicle. Also, it is desirable that a range in which the damping force can be adjusted is wide for adjusting the damping force meticulously in accordance with vehicle specifications.

An object of the present invention is to provide a front fork capable of improving the feeling of damping force and widening the range in which the damping force can be adjusted.

In view of the above, according to an embodiment of the present invention, there is provided a front fork including cylindrical two tubes arranged so as to be coaxial to each other and relatively moving with respect to each other in an axial direction, an axle holder covering an opening in a lower side of an inner tube as the tube protruding downward in the two tubes, a tubular inner cylinder attached to the axle holder so as to be arranged inside the inner tube, a forming member arranged in an upper part of the inner cylinder and forming a working oil chamber in which working oil is filled in an inner space of the inner tube, a penetrating member a part of which penetrates the forming member to enter the working oil chamber, relatively moving with respect to the inner tube with an outer tube as the tube protruding upward in the two tubes, a sectioning member attached to a lower end portion of the penetrating member and sectioning the working oil chamber in the inner cylinder into an upper oil chamber positioned in an upper part and a lower oil chamber positioned in a lower part, a communicating portion communicating the upper oil chamber to an outer oil chamber as an oil chamber formed between an inner peripheral surface of the inner tube and an outer peripheral surface of the inner cylinder, and a damping force generating portion forming an external flow path for circulating working oil to the lower oil chamber and the outer oil chamber at an outside of the inner tube, and in which the damping force generating portion includes a first damping force generating portion generating resistance in working oil flowing in one direction in the external flow path to generate damping force, a second damping force generating portion disposed in series with the first damping force generating portion on the external flow path to generate resistance in working oil flowing in the other direction in the external flow path to generate damping force, an intermediate oil chamber formed between the first damping force generating portion and the second damping force generating portion, and a pressurization portion having an oil reservoir chamber communicated to the intermediate oil chamber and pressurizing working oil in the intermediate oil chamber by working oil filled in the oil reservoir chamber.

The front fork may have configuration in which a compression side flow path in which working oil in the lower oil chamber flows toward the upper oil chamber through the external flow path in a compression side stroke is provided in the damping force generating portion, a compression side damping valve is provided on an upstream side of the compression side flow path, a compression side check valve is provided in a downstream side of the compression side flow path, and an intermediate portion between the compression side damping valve and the compression side check valve in the compression side flow path is communicated to the oil reservoir chamber, and an extension side flow path in which working oil in the upper oil chamber flows toward the lower oil chamber through the external flow path in an extension side stroke is provided in the damping force generating portion, an extension side damping valve is provided on an upstream side of the extension side flow path, an extension side check valve is provided in a downstream side of the extension side flow path, and an intermediate portion between the extension side damping valve and the extension side check valve in the extension side flow path is communicated to the oil reservoir chamber. Accordingly, a stable feeling of damping force can be obtained with a simple structure.

Also in the front fork according to the embodiment, the damping force generating portion may include a first bypass flow path reaching the intermediate oil chamber from the lower oil chamber while bypassing the compression side flow path, a first adjusting portion adjusting a flow amount of working oil flowing to the first bypass flow path, a second bypass flow path reaching the intermediate oil chamber from the outer oil chamber while bypassing the extension side flow path, and a second adjusting portion adjusting a flow amount of working oil flowing to the second bypass flow path. Accordingly, the damping force can be easily adjusted.

According to the embodiment of the present invention, it is possible to provide the front fork capable of improving the feeling of damping force as well as widening the range in which the damping force can be adjusted.

BRIEF DESCRIPTION OF THE DRAWINGS

FIGS. 6A and 6B are views for explaining operation of a damping force generating portion;
and
FIGS. 7A and 7B are views for explaining the operation of the damping force generating portion.

DETAILED DESCRIPTION OF THE INVENTION

Hereinafter, an embodiment of the present invention will be explained in detail with reference to the attached drawings.

Figure 1:
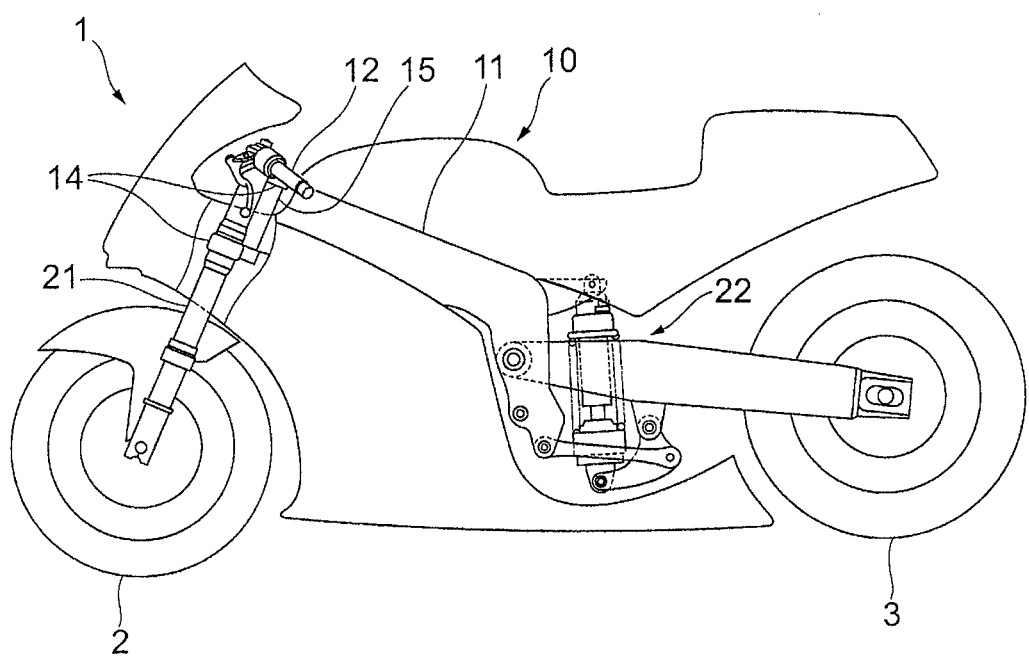
FIG. 1 is a view showing a schematic structure of a motorcycle in which a front fork according to an embodiment of the present invention is involved.

FIG. 1 is a view showing a schematic structure of a motorcycle 1 in which a front fork 21 according to the embodiment of the present invention is involved.

The motorcycle 1 includes a front wheel 2 as a wheel in the front side, a rear wheel 3 as a wheel in the rear side and a vehicle body 10 having a vehicle frame 11 as a framework of the motor cycle 1, a handlebar 12, an engine (not shown) and so on. The motorcycle 1 also has front forks 21 each connecting the front wheel 2 to the vehicle body 10 in a left side and a right side of the front wheel 2 respectively and a rear suspension 22 connecting the rear wheel 3 to the vehicle body 10 provided between the rear wheel 3 and the vehicle body 10. In FIG. 1, only the front fork 21 arranged in the left side is shown. The motorcycle 1 further includes two brackets 14 for holding the front fork 21 arranged in the left side of the front wheel 2 and the front fork 21 arranged in the right side of the front wheel 2 and a stem shaft (not shown) arranged between the two brackets 14. The stem shaft is rotatably supported by a head pipe 15 of the vehicle frame 11.

Next, the front fork 21 will be explained in detail.

Figure 2:
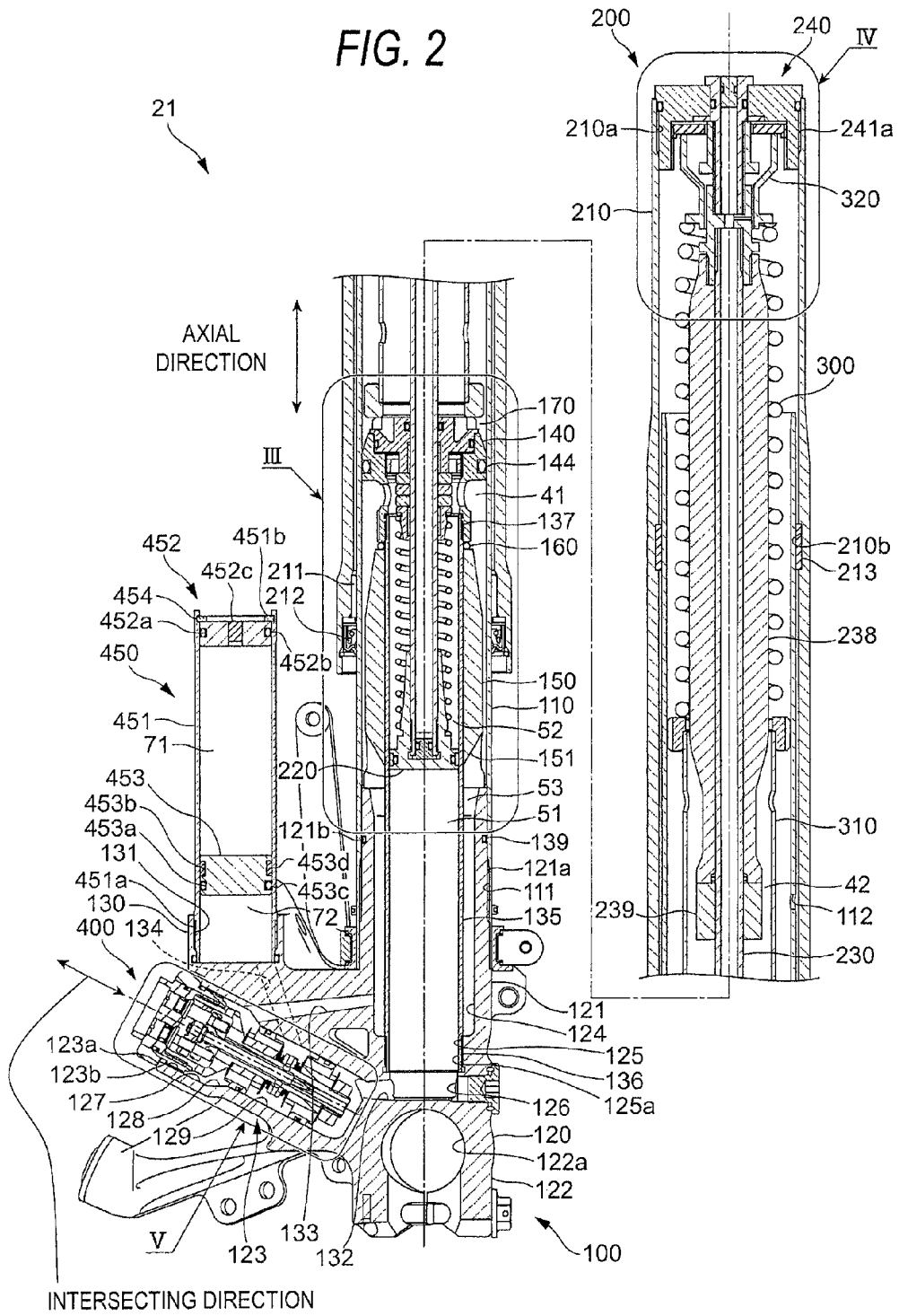
FIG. 2 is a cross-sectional view of the front fork according to the embodiment of the present invention.

FIG. 2 is a cross-sectional view of the front fork 21 according to the embodiment of the present invention.

Figure 3:
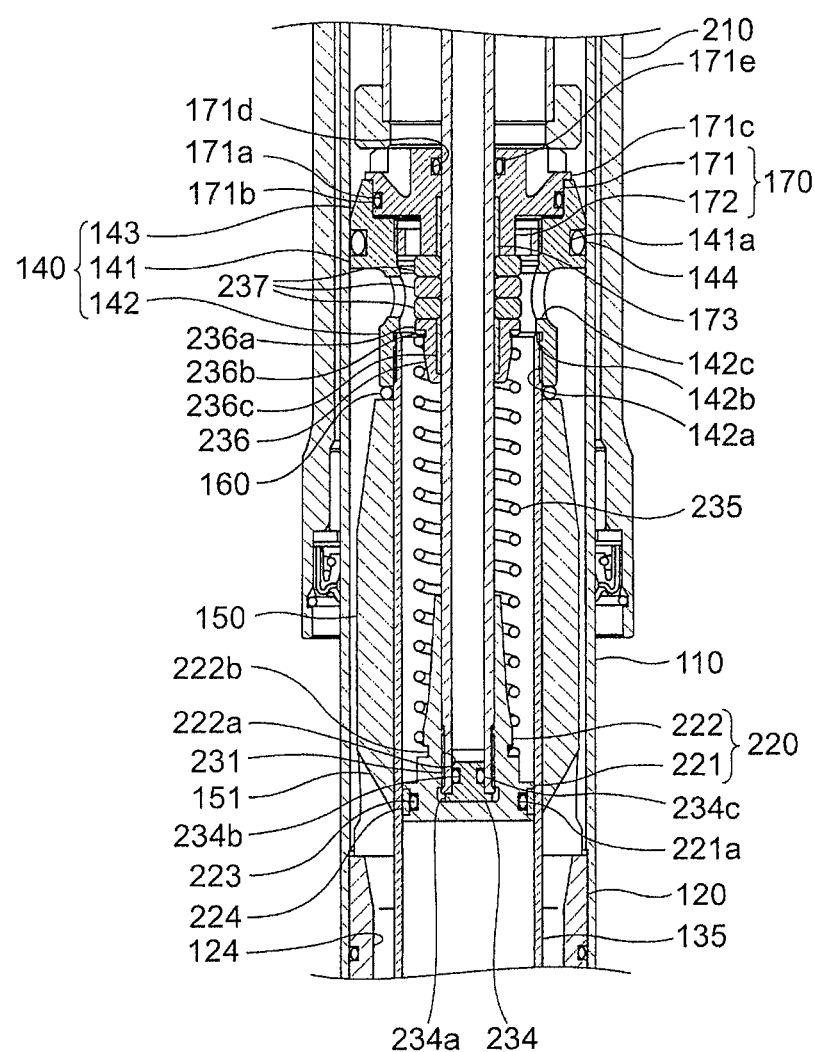
FIG. 3 is an enlarged view of Part III of FIG. 2.
Figure 4:
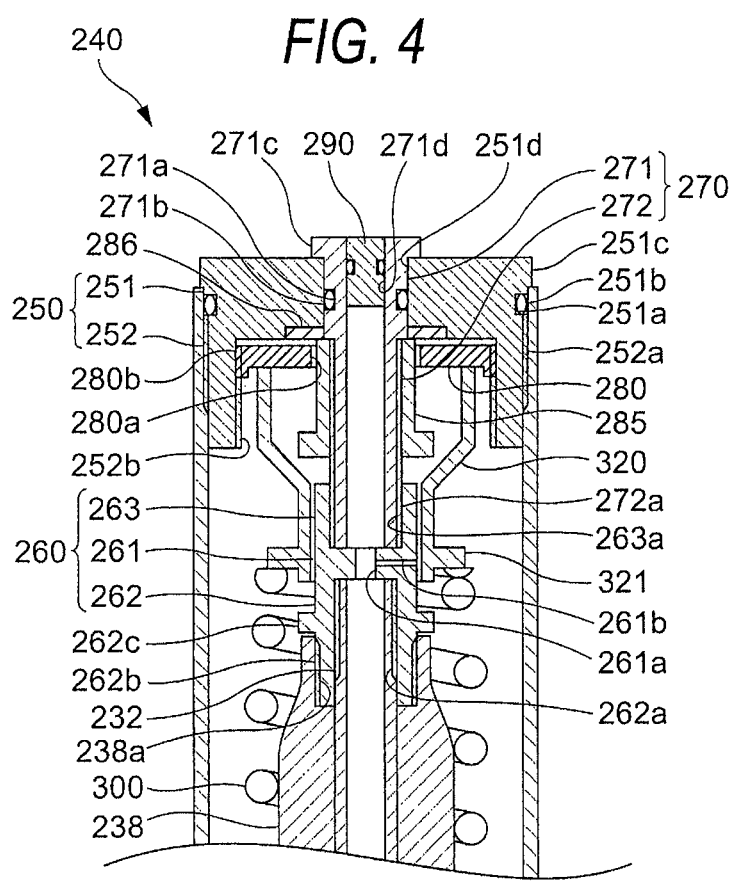
FIG. 4 is an enlarged view of Part IV of FIG. 2.
Figure 5:
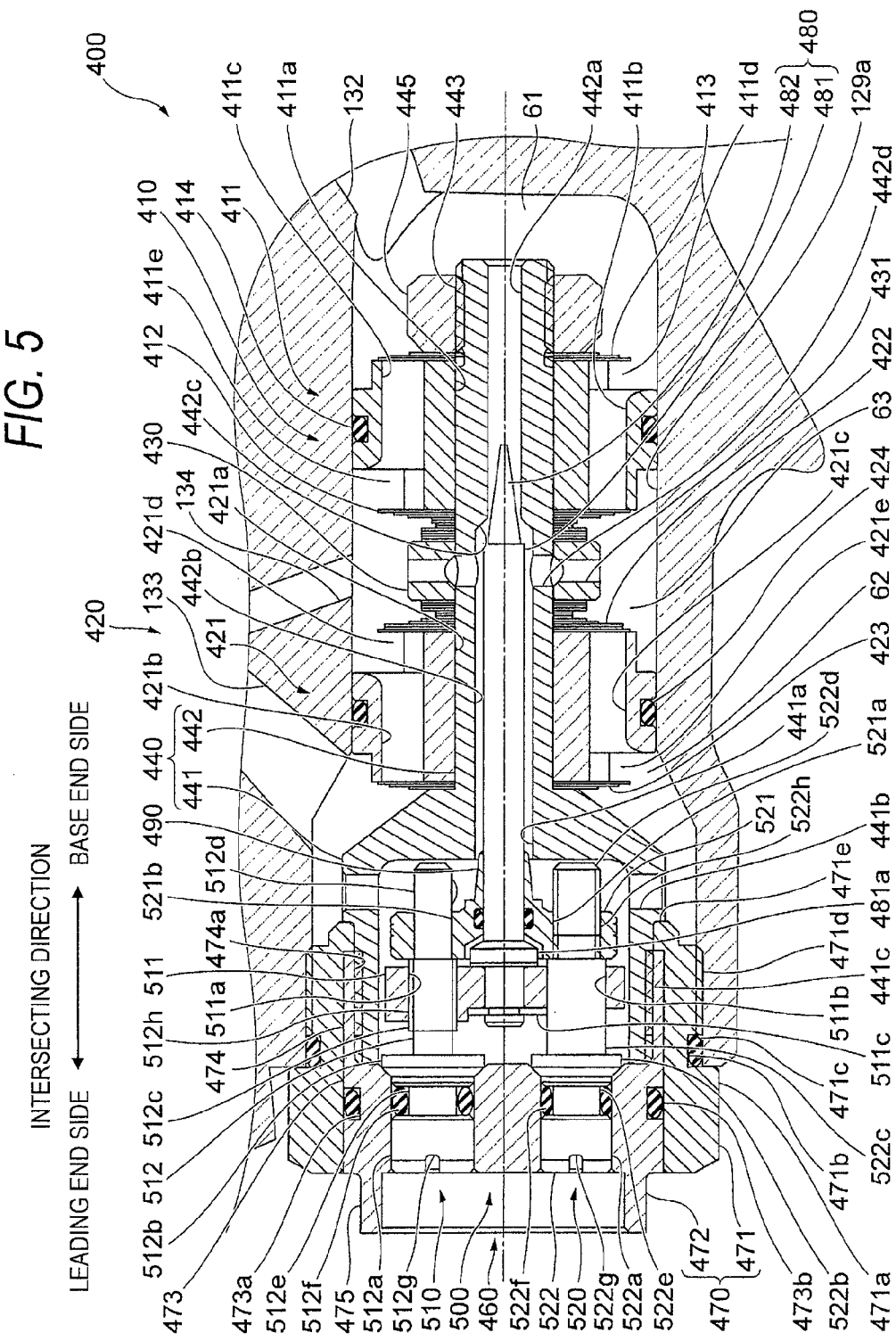
FIG. 5 is an enlarged view of Part V of FIG. 2.

FIG. 3 is an enlarged view of Part III of FIG. 2.
FIG. 4 is an enlarged view of Part IV of FIG. 2.
FIG. 5 is an enlarged view of Part V of FIG. 2.

The front fork 21 according to the embodiment is arranged between the vehicle body 10 and the front wheel 2 of the motorcycle 1 to support the front wheel 2, which is a so-called upside-down front fork in which a later-described inner tube 110 is disposed in the front-wheel 2 side and an outer tube 210 is disposed in the vehicle body 10 side.

The front fork 21 includes an axle-side unit 100 having the inner tube 110 and installed to an axle of the front wheel 2 and a body-side unit 200 having the outer tube 210 and installed to the vehicle body 10. The front fork 21 also includes a coil spring 300 arranged between the axle-side unit 100 and the body-side unit 200 and absorbing shock received by the front wheel 2 caused by unevenness of a road surface, a damping force generating portion 400 dampening the shock. The front fork 21 further includes a spring collar 310 disposed between the coil spring 300 and the vehicle-side unit 100 and a spring sheet 320 disposed between the coil spring 300 and the body-side unit 200.

The inner tube 110 and the outer tube 210 are members having a substantially cylindrical shape which are coaxially arranged, and a direction of a center line of these cylinders is referred to as an "axial direction" in the following description. The vehicle body 10 side may be referred to as an upper side and the front wheel 2 side may be referred to as a lower side.

In the front fork 21, the axle-side unit 100 and the body-side unit 200 relatively move in the axial direction, thereby absorbing shock received by the front wheel 2 caused by unevenness of the road surface and suppressing vibration while supporting the front wheel 2.

(Structure of Axle-Side Unit 100)

The axle-side unit 100 includes the substantially cylindrical inner tube 110 both ends of which are opened, an axle holder 120 fixed to an end (lower end) of a lower side of the inner tube 110 as well as fixed to the front wheel 2, and an O-ring 139 sealing between the inner tube 110 and the axle holder 120. The axle-side unit 100 also includes a substantially cylindrical inner cylinder 135 attached to the axle holder 120 so as to be disposed inside the inner tube 110, a forming member 140 fixed to an end portion (upper end portion) of an upper side of the inner cylinder 135 to form a working oil chamber 41 in which working oil is filled inside an internal space of the inner tube 110, an intermediate member 150 disposed between the forming member 140 and the axle holder 120, an O-ring 160 disposed between the intermediate member 150 and the forming member 140, and a cover member 170 covering an opening of an upper side of the forming member 140.

(Structure of Inner Tube 110)

The inner tube 110 is formed so that an outer diameter thereof is smaller than an inner diameter of the outer tube 210, and an annular gap is formed between an outer peripheral surface of the inner tube 110 and an inner peripheral surface of the outer tube 210 in a state where the inner tube 110 is inserted into the outer tube 210.

An inner peripheral surface of the inner tube 110 is basically formed with a uniform inner diameter along the axial direction, and a female screw 111 into which a later-described male screw 121a of the axle holder 120 is screwed is formed on the inner peripheral surface at an end portion of the lower side. On the other hand, the outer peripheral surface of the inner tube 110 is basically formed with a uniform outer diameter along the axial direction.

In a central portion of the inner tube 110 in the axial direction, a communicating hole 112 communicating between the inside and the outside is formed. Inside the inner tube 110, oil is filled to the level higher than the communicating hole 112.

(Structure of Axle Holder 120)

As shown in FIG. 2, the axle holder 120 includes an insertion portion 121 to be inserted into the inner tube 110 in an upper part and an axle mounting portion 122 in which an axle mounting hole 122a which can be mounted to the axle of the front wheel 2 is formed in a lower part. The axle holder 120 also includes a circulation portion 123 provided outside an outer periphery of the insertion portion 121 and circulating oil for generating damping force is at an outside of the inner tube 110.

An outer peripheral surface of the insertion portion 121 is formed so as to extend along the inner peripheral surface of the inner tube 110, the male screw 121a screwed into the female screw 111 formed in the inner tube 110 is formed at a lower part of the outer peripheral surface, and a ring groove 121b to which the O-ring 139 is fitted is formed in an upper part of the outer peripheral surface. The axle holder 120 holds the inner tube 110 by the O-ring 139 fitted to the ring groove 121b in a state of being screwed in a liquid tight manner so as not to leak the oil.

Also in the axle holder 120, there are formed a first concave portion 124 as a substantially columnar concave portion the center line direction of which is the axial direction from an upper end of the insertion portion 121, a second concave portion 125 as a substantially columnar concave portion the center line direction of which is the axial direction from a lower end of the first concave portion 124 and a third concave portion 126 as a substantially columnar concave portion the center line direction of which is the axial direction from a lower end of the second concave portion 125. A size of an inner diameter of the second concave portion 125 is smaller than a size of an inner diameter of the first concave portion 124, and a size of an inner diameter of the third concave portion 126 is smaller than the size of the inner diameter of the second concave portion 125.

As the first concave portion 124, the second concave portion 125 and the third concave portion 126 are provided in the axle holder 120, the oil is stored in these first concave portion 124, the second concave portion 125 and the third concave portion 126.

Also in the axle holder 120, a female screw 125a into which a later-described male screw 136 formed on an outer peripheral surface of a lower end portion of the inner cylinder 135 is screwed is formed on a wall forming the second concave portion 125.

In the circulation portion 123, there are formed a first-intersecting direction concave portion 127 as a substantially columnar concave portion a center line direction of which is an intersecting direction which is a direction intersecting with the axial direction, a second-intersecting direction concave portion 128 as a substantially conical concave portion a center line direction of which is the intersecting direction from an end portion of the axle mounting portion 122 side (hereinafter also referred to as a "base end side") in the first-intersecting direction concave portion 127, and a third-intersecting direction concave portion 129 as a substantially columnar concave portion a center line direction of which is the intersecting direction from an end portion of the base end side in the second-intersecting direction concave portion 128. The circulation portion 123 includes a leading end surface 123a orthogonal to the intersecting direction at an end portion in the opposite side (hereinafter also referred to as a "leading end side") of the axle mounting portion 122 side in the first-intersecting direction concave portion 127. In addition, a female screw 123b is formed on a side portion of the first-intersecting direction concave portion 127.

The circulation portion 123 includes a protruding portion 130 protruding upward in a cylindrical shape above the leading end surface 123a. On an inner peripheral surface of the protruding portion 130, a female screw 131 into which a male screw 451a formed in a space forming member 451 of a later-described pressurization portion 450 is screwed is formed. The space forming member 451 of the pressurization portion 450 is held by the axle holder 120 in a liquid tight manner by the male screw 451a being screwed into the female screw 131.

Additionally, in the axle holder 120, there are formed a base-end side communicating hole 132 communicating an end portion of a base-end side in the third-intersecting direction concave portion 129 of the circulation portion 123 to the third concave portion 126 and a leading end-side communicating hole 133 communicating the first-intersecting direction concave portion 127 and the second-intersecting direction concave portion 128 to the first concave portion 124. Also in the axle holder 120, there is formed a central communicating hole 134 communicating a central portion of the third-intersecting direction concave portion 129 of the circulation portion 123 in the intersecting direction to an inside of the protruding portion 130.

(Structure of Inner Cylinder 135)

The inner cylinder 135 is a thin-walled cylindrical member, in which the male screw 136 screwed into the female screw 125a formed in the axle holder 120 is formed at a lower end portion, and a male screw 137 screwed into a later-described female screw 142a formed in the forming member 140 is formed at an upper end portion.

The inner cylinder 135 is held by the axle holder 120 in a liquid tight manner by the male screw 136 formed at the lower end portion being screwed into the female screw 125a formed in the axle holder 120.

(Structure of Forming Member 140)

The forming member 140 includes a first cylindrical portion 141 having a substantially cylindrical shape, a second cylindrical portion 142 having a substantially cylindrical shape and protruding downward from a lower end portion of the first cylindrical portion 141, a third cylindrical portion 143 having a substantially cylindrical shape and protruding upward from an upper end portion of the first cylindrical portion 141, and an O-ring 144 sealing between the forming member 140 and the inner peripheral surface of the inner tube 110.

In an outer peripheral portion of the first cylindrical portion 141, a ring groove 141a is formed to be concave from an outer peripheral surface, and the O-ring 144 is fitted to the ring groove 141a.

In an inner peripheral surface of a lower end portion of the second cylindrical portion 142, the female 142a to which the male screw 137 formed in the upper end portion of the inner cylinder 135 is screwed is formed. Above the female screw 142a in the second cylindrical portion 142, there is provided an abutting surface 142b formed so as to be orthogonal to the axial direction, and an upper end surface of the inner cylinder 135 abuts on the abutting surface 142b so that upward movement of the inner cylinder 135 is prevented. A communicating hole 142c as an example of a communicating portion communicating between an inside and an outside of the second cylindrical portion 142 is formed above the abutting surface 142b.

The cover member 170 is screwed in a liquid tight manner inside the first cylindrical portion 141 and the third cylindrical portion 143. This screwing is realized by the male screw formed in an outer peripheral surface of a later-described second cylindrical portion 172 of the cover member 170 being screwed into the female screw formed in an inner peripheral surface of the first cylindrical portion 141.

The forming member 140 formed in the manner described above is held by the inner cylinder 135 by the male screw 137 of the inner cylinder 135 being screwed into the female screw 142a formed in the second cylindrical portion 142. Then, the O-ring 144 fitted to the ring groove 141a of the first cylindrical portion 141 is compressed by the ring groove 141a and the inner peripheral surface of the inner tube 110, thereby storing the oil filled inside the inner tube 110 in a part lower than the O-ring 144.

That is, the forming member 140 sections a space inside the inner tube 110 into the working oil chamber 41 as a space lower than the O-ring 144, in which part of the oil filled inside the inner tube 110 is circulated as working oil, and an air chamber 42 as a space above the O-ring 144, in which oil circulated as a lubricating oil and air are filled. The lubricating oil is circulated between the inside of the inner tube 110 and the annular gap formed between the outer peripheral surface of the inner tube 110 and the inner peripheral surface of the outer tube 210 through the communicating hole 112 formed in the inner tube 110, thereby lubricating a sliding portion between the inner tube 110 and the outer tube 210 and a sliding portion of the coil spring 300.

(Structure of Intermediate Member 150)

As shown in FIG. 3, the intermediate member 150 is a substantially cylindrical member formed so that an inner diameter thereof is larger than an outer diameter of the inner cylinder 135 and an outer diameter thereof is smaller than an inner diameter of the inner tube 110. A lower end surface of the intermediate member 150 contacts an upper end surface of the axle holder 120. That is, the intermediate member 150 is placed on the axle holder 120 and pressed by the forming member 140 through the O-ring 160.

Plural concave portions 151 formed to be concave upward from a lower end surface are formed at a lower portion of the intermediate member 150 in a circumferential direction. As the concave portions 151 are formed in the intermediate member 150 and the outer diameter of the intermediate member 150 is formed to be smaller than the inner diameter of the inner tube 110, the working oil is circulated between a space below the intermediate member 150, that is, a space inside the first concave portion 124 of the axle holder 120 as well as outside the outer peripheral surface of the inner cylinder 135 and a space above the intermediate member 150.

In the following explanation, a space including a space formed by a wall surface forming the first concave portion 124 of the axle holder 120 and an outer peripheral surface of the inner cylinder 135, and a space positioned above, which is formed by the inner peripheral surface of the inner tube 110, the outer peripheral surface of the inner cylinder 135, the outer peripheral surface of the intermediate member 150, an outer peripheral surface of the O-ring 160 and an outer surface of the forming member 140 may be referred to as an annular oil chamber 53. The annular oil chamber 53 functions as a part of an outer oil chamber which is an oil chamber formed between the inner peripheral surface of the inner tube 110 and the outer peripheral surface of the inner cylinder 135.

(Structure of Cover Member 170)

As shown in FIG. 3, the cover member 170 includes a first cylindrical portion 171 having a substantially cylindrical shape and a second cylindrical portion 172 having a substantially cylindrical shape, which protrudes downward from a lower end portion of the first cylindrical portion 171.

In an outer peripheral portion of the first cylindrical portion 171, a ring groove 171a formed to be concave from an outer peripheral surface is formed, and an O-ring 171b is fitted to the ring groove 171a. The first cylindrical portion 171 includes a flange portion 171c at an upper end portion so that an outer diameter is larger than an inner diameter of the third cylindrical portion 143 of the forming member 140.

In an inner peripheral portion of the first cylindrical portion 171, a ring groove 171d formed to be concave from an inner peripheral surface is formed, and an O-ring 171e is fitted to the ring groove 171d. Moreover, a cylindrical bush 173 is fitted from a lower end portion of the inner peripheral portion of the first cylindrical portion 171 to a lower end portion of an inner peripheral portion of the second cylindrical portion 172.

The spring collar 310 is disposed above the cover member 170, and the spring collar 310 supports a lower end portion of the coil spring 300.

(Structure of Body-Side Unit 200)

As shown in FIG. 2, the body-side unit 200 includes the substantially cylindrical outer tube 210 both ends of which are opened, a guide bush 211 fixed to an end portion (lower end portion) in a lower side of the outer tube 210 and an oil seal 212 fixed to a position lower than the guide bush 211.

The body-side unit 200 also includes a piston 220 as an example of a sectioning member sliding inside the inner cylinder 135, a piston rod 230 as an example of a penetrating member holding the piston 220 in an end portion of a lower side thereof and a cap 240 holding the piston rod 230 as well as covering an opening end of an upper side of the outer tube 210. The body-side unit 200 also includes, as shown in FIG. 3, a rebound spring 235 absorbing shock generated when the piston 220 moves in the maximum extended direction, a rebound spring guide 236 guiding the rebound spring 235 and plural collars 237 disposed between the rebound spring guide 236 and the cover member 170 of the axle-side unit 100.

The body-side unit 200 also has, as shown in FIG. 2, a coil spring guide 238 guiding the coil spring 300 and a bump rubber 239 held in a lower end portion of the coil spring guide 238.

(Structure of Outer Tube 210)

As shown in FIG. 2, the outer tube 210 is a substantially cylindrical member, a diameter of a lower portion of which is expanded so as to hold the guide bush 211 and the oil seal 212 inside, and a female screw 210a into which a male screw 241a formed in the cap 240 is screwed is formed on an inner peripheral surface in an upper part of the outer tube 210. In a position slightly upper than a central portion in the axial direction of the outer tube 210, a concave portion 210b is formed so to be concave around the inner peripheral surface. A guide bush 213 for smoothing sliding movement with respect to the outer peripheral surface of the inner tube 110 is fitted to the concave portion 210b.

The guide bushes 211 and 213 are members for smoothing sliding movement between the inner peripheral surface of the outer tube 210 and the outer peripheral surface of the inner tube 110. These guide bushes 211 and 213 are bearings formed in a cylindrical shape, and inner diameters of the guide bushes 211 and 213 are set to be smaller than the inner diameter of the outer tube 210 so that inner peripheral portions thereof protrude closer to the inside than the inner peripheral surface of the outer tube 210 in a state of being mounted to the outer tube 210.

(Structure of Piston 220)

The piston 220 includes, as shown in FIG. 3, a columnar portion 221 having a substantially columnar shape provided in a lower portion and a cylindrical portion 222 having a substantially cylindrical shape protruding upward from an upper end portion of the columnar portion 221.

An outer diameter of the columnar portion 221 is formed to be smaller than the inner diameter of the inner cylinder 135. In an outer peripheral portion of the columnar portion 221, a groove 221a is formed in two stages to be concave from an outer peripheral surface, and an O-ring 223 and a piston ring 224 are fitted to the groove 221a.

An inner diameter of the cylindrical portion 222 is formed larger than an outer diameter of the piston rod 230, and a female screw 222a into which a later-described male screw 231 formed in a lower portion of the piston rod 230 is screwed is formed in an inner peripheral surface in a lower portion of the cylindrical portion 222. Also, a concave portion 222b is formed in the lower portion of the cylindrical portion 222 so as to be concave from the outer peripheral surface, and a lower end portion of the rebound spring 235 is fitted to the concave portion 222b. An outer diameter of the cylindrical portion 222 is formed to be gradually smaller toward an upper side in a range from an upper part of the concave portion 222b to an upper end portion of the cylindrical portion 222.

The piston 220 formed as described above is held by the piston rod 230 by the female screw 222a formed in the cylindrical portion 222 being screwed with the male screw 231 of the piston rod 230. Then, the O-ring 223 and the piston ring 224 fitted to the columnar portion 221 are compressed by the groove 221a and the inner peripheral surface of the inner cylinder 135, thereby sectioning a space in the inner cylinder 135 into a lower oil chamber 51 positioned lower than the O-ring 223 and the piston ring 224 and an upper oil chamber 52 positioned upper than the O-ring and the piston ring 224.

(Structure of Piston Rod 230)

As shown in FIG. 2, the piston rod 230 is a thin-walled cylindrical member, in which the male screw 231 to be screwed into the female screw 222a formed in the piston 220 is formed in a lower end portion, and a male screw 232 to be screwed into a later-described female screw 262a formed in a rod holding member 260 of the cap 240 is formed in an upper end portion.

The piston rod 230 is held by the cap 240 by the male screw 232 formed in the upper end portion being screwed into the female screw 262a formed in the rod holding member 260 of the cap 240.

The piston rod 230 also includes a blocking member 234 blocking an opening of the lower end portion. The blocking member 234 is a substantially columnar member, including a flange portion 234a formed at an lower end side so that an outer diameter thereof is larger than an inner diameter of the piston rod 230. There is also formed a ring groove 234b in an outer peripheral portion from an outer peripheral surface, and an O-ring 234c is fitted to the ring groove 234b. It is possible to prevent working oil from entering an inside of the piston rod 230 by the O-ring 234c fitted to the ring groove 234b.

As shown in FIG. 3, the rebound spring guide 236 is a substantially cylindrical member having an outer diameter smaller than an inner diameter of the rebound spring 235, having a flange portion 236a formed at an upper end so that an outer diameter is larger than an outer diameter of the rebound spring 235. A concave portion 236b is formed to be concave from an outer peripheral surface below the flange portion 236a, and an upper end portion of the rebound spring 235 is fitted to the concave portion 236b. Also, a cylindrical bush 236c is fitted to an inner peripheral portion of the rebound spring guide 236.

The collars 237 are annular members made of resin. A plurality of collars (three in the embodiment) 237 are arranged one behind another in the axial direction between the rebound spring guide 236 and the cover member 170 of the axle-side unit 100. A length at a maximum extended state and a stroke amount of the front fork 21 are adjusted by the collars 237.

As shown in FIG. 2, the coil spring guide 238 is a substantially-cylindrical member having an outer diameter smaller than an inner diameter of the coil spring 300, and a female screw 238a into which a later-described male screw 262b of the rod holding member 260 is screwed is formed in an inner peripheral portion of an upper end portion. The coil spring guide 238 is held by the rod holding member 260 by the male screw 262b of the rod holding member 260 being screwed into the female screw 238a.

The bump rubber 239 is an elastic member having a substantially cylindrical shape and made of rubber or resin. The bump rubber 239 abuts on the cover member 170 of the axle-side unit 100 at a maximum compressed state of the front fork 21, thereby cushioning shock.

(Structure of Cap 240)

The cap 240 includes a cap base 250 to be a base and a rod holding member 260 holding the piston rod 230 as shown in FIG. 4. The cap 240 includes an adjusting member 270 inserted into an inside of the cap base 250 to hold the rod holding member 260 and to adjust a length of the coil spring 300. The cap 240 also includes a slider 280 arranged between the adjusting member 270 and the spring sheet 320 and sliding in the axial direction, a lock nut 285 screwed to the adjusting member 270, a thrust washer 286 arranged between the lock nut 285 and the cap base 250 and a sealing screw 290 blocking communication between the inside and the outside of the outer tube 210.

The cap base 250 includes a first cylindrical portion 251 having a substantially cylindrical shape and a second cylindrical portion 252 having a substantially cylindrical shape and protruding downward from a lower end portion of the first cylindrical portion 251.

A ring groove 251a is formed to be concave from an outer peripheral surface at an outer peripheral portion of the first cylindrical portion 251, and an O-ring 251b is fitted to the ring groove 251a. The first cylindrical portion 251 also has a flange portion 251c formed at an upper end portion so that an outer diameter thereof is larger than the inner diameter of the outer tube 210.

On an outer peripheral surface of the second cylindrical portion 252, there is formed a male screw 252a to be screwed into the female screw 210a formed on the upper end portion of the outer tube 210. The cap base 250 is held by the outer tube 210 in an airtight manner by the male screw 252a being screwed into the female screw 210a. Moreover, a female screw 252b screwed with a male screw 280b formed on an outer peripheral surface of the slider 280 is formed on an inner peripheral portion of the second cylindrical portion 252.

The rod holding member 260 includes a columnar portion 261 having a substantially columnar shape, a lower cylindrical portion 262 having a substantially cylindrical shape, which protrudes downward from a lower end portion of the columnar portion 261 and an upper cylindrical portion 263 having a substantially cylindrical shape, which protrudes upward from an upper end portion of the columnar portion 261.

On an inner peripheral surface of the lower cylindrical portion 262, there is formed the female screw 262a into which the male screw 232 formed in the upper end portion of the piston rod 230 is screwed. On an outer peripheral surface of the lower cylindrical portion 262, there is formed the male screw 262b screwed into the female screw 238a of the coil spring guide 238, and a projection 262c projecting from the outer peripheral surface is provided on an outer peripheral portion at a position upper than the male screw 262b.

On an inner peripheral surface of the upper cylindrical portion 263, there is formed a female screw 263a into which a later-described male screw 272a formed in the adjusting member 270 is screwed.

In a central portion of the columnar portion 261, there is formed a vertical through hole 261a in the axial direction so as to communicate between an inside of the lower cylindrical portion 262 and an inside of the upper cylindrical portion 263. Also, in the central portion of the columnar portion 261 in the axial direction, there is formed a horizontal through hole 261b formed in a direction intersecting with the axial direction so as to communicate between the vertical through hole 261a and an outside of the rod holding member 260.

The adjusting member 270 includes a first cylindrical portion 271 having a substantially cylindrical shape, and a second cylindrical portion 272 having a substantially cylindrical shape, which protrudes downward from a lower end portion of the first cylindrical portion 271.

The first cylindrical portion 271 is formed so that an outer diameter thereof is smaller than an inner diameter 251d of the first cylindrical portion 251 of the cap base 250. Also, a ring groove 271a is formed to be concave from an outer peripheral surface in an outer peripheral portion of the first cylindrical portion 271, and an O-ring 271b is fitted to the ring groove 271a. The O-ring 271b contacts the cap base 250, thereby keeping airtightness. The first cylindrical portion 271 also includes a flange portion 271c formed so that an outer diameter is larger than the inner diameter of the first cylindrical portion 251 of the cap base 250. On an inner peripheral surface of the first cylindrical portion 271, a female screw 271d to which a sealing screw 290 is screwed is formed.

On an outer peripheral surface of the second cylindrical portion 272, the male screw 272a screwed into the female screw 263a formed in the rod holding member 260 is formed. The lock nut 285 is screwed with the male screw 272a with a left-hand thread.

The slider 280 is a substantially cylindrical member, in which a hexagonal fitting hole 280a to be fitted to a hexagon which is an outer shape of the lock nut 285 is formed on an inner peripheral surface. On an outer peripheral surface of the slider 280, the male screw 280b fitted to a female screw 252b formed on an inner peripheral surface of the cap base 250 is formed.

An outer shape of an upper end surface of the lock nut 285 is formed to be larger than an outer shape of a lower end surface of the first cylindrical portion 271 of the adjusting member 270, and the upper end surface of the lock nut 285 abuts on a lower end surface of the thrust washer 286, thereby preventing the adjusting member 270 from falling off from the cap base 250.

The cap 240 constructed as the above is screwed to the outer tube 210 in an airtight manner by the male screw 252a formed in the cap base 250 being screwed into the female screw 210a formed in the upper end portion of the outer tube 210. Then, the male screw 272a of the adjusting member 270 inserted into the cap base 250 from the second cylindrical portion 272 side is screwed into the female screw 263a formed in the rod holding member 160 which holds the piston rod 230. Also, the lock nut 285 is screwed with the male screw 272a of the adjusting member 270. The lock nut 285 is also fitted to the fitting hole 280a of the slider 280. The male screw 280b formed on the outer peripheral surface of the slider 180 is fitted into the female screw 252b formed on the inner peripheral surface of the cap base 250. When the adjusting member 270 is rotated, the lock nut 285 fixed to the adjusting member 270 is rotated together, then, the slider 280 is rotated and moves in the axial direction. As the slider 180 moves in the axial direction, the spring sheet 320 supporting an upper end surface of the coil spring 300 moves in the axial direction. Due to the above structure, the length of the coil spring 300 can be adjusted by rotating the adjusting member 270, and an initial setting load of the coil spring 300 can be adjusted. Additionally, it is possible to release air in the front fork 21 through the vertical through hole 261a and the horizontal through hole 261b formed in the rod holding member 260. Then, the sealing screw 290 is screwed into a female screw 271d formed on an inner peripheral surface of the adjusting member 270, thereby blocking between the inside and the outside of the outer tube 210.

(Structure of Spring Sheet 320)

The spring sheet 320 is a cylindrical member and is formed so that an outer diameter and an inner diameter of an upper end portion are larger than an outer diameter and an inner diameter of a lower end portion as shown in FIG. 4. On an outer peripheral portion on the lower end portion side, a protruding portion 321 protruding from an outer peripheral surface is formed. An outer diameter of the protruding portion 321 is larger than an inner diameter of the coil spring 300, and a lower end surface of the protruding portion 321 functions as a support surface supporting the upper end portion of the coil spring 300.

(Structure of Damping Force Generating Portion 400)

As shown in FIG. 5, the damping force generating portion 400 includes a first valve unit 410 and a second valve unit 420 generating damping force, an intermediate member 430 disposed between the first valve unit 410 and the second valve unit 420, a base member 440 to which the first valve unit 410, the second valve unit 420 and the intermediate member 430 are attached, and a nut 445 preventing the first value unit 410 and so on from falling off from the base member 440. The damping force generating portion 400 also includes the pressurization portion 450 (refer to FIG. 2) pressurizing working oil used for generating damping force, a damping force adjusting portion 460 adjusting damping force and a cap 470 covering an opening of the first-intersecting direction concave portion 127 of the axle holder 120.

The base member 440 is inserted into the first-intersecting direction concave portion 127, the second-intersecting direction concave portion 128 and the third-intersecting direction concave portion 129 from the leading end side toward the base end side in the intersecting direction and fixed to the axle holder 120 in the state where the first valve unit 410, the second valve unit 420, the intermediate member 430, the cap 470 and so on are attached.

(Structure of First Valve Unit 410)

As shown in FIG. 5, the first valve unit 410 includes a first flow-path forming member 411 forming a flow path of fluid for generating damping force, a first damping valve 412 arranged at an end portion in a leading end side of the first flow-path forming member 411 and opening/closing the flow path in the leading end side of the first flow-path forming member 411 in accordance with a flow of fluid and a first damping check valve 413 provided at an end portion in the base end side of the first flow-path forming member 411. The first valve unit 410 also includes an O-ring 414 provided interposed between the first flow-path forming member 411 and a side surface 129a (may be referred to as a "third side surface 129a") of the third-intersecting direction concave portion 129 in the axle holder 120.

The first flow-path forming member 411 is a member formed in a thick-walled substantially cylindrical shape so that an outer diameter is approximately equal to an inner diameter of the third side surface 129a. Additionally, in the first flow-path forming member 411, there are formed a through hole 411a formed in the intersecting direction, into which a later-described shaft portion 442 of the base member 440 is inserted, a first compression-side flow path 411b configured by a through hole formed in the intersecting direction at a portion outer than the through hole 411a in a radial direction, and a first extension-side flow path 411c configured by a through hole formed in the intersecting direction. Furthermore, in the first flow-path forming member 411, there are formed an oil path 411d formed extended in a radial direction at an end portion in the base end side as well as communicated to the first compression-side flow path 411b and an oil path 411e formed extended in the radial direction at an end portion in the leading end side as well as communicated to the first extension-side flow path 411c. A plurality of (for example, three) first compression-side flow paths 411b and first extension-side flow paths 411c are respectively formed in a circumferential direction at equal intervals, which function as communication paths communicating between a first oil chamber 61 and an intermediate oil chamber 63.

The first damping valve 412 is formed by plural metal plates having a substantially disk shape being stacked as shown in FIG. 5. In the first damping valve 412, a through hole is formed in a center of respective metal plates, and the later-described shaft portion 442 of the base member 440 is inserted into the through holes. Then, the first damping valve 412 blocks the first compression-side flow path 411b and opens the first extension-side flow path 411c.

The first damping check valve 413 is formed by plural metal plates having a substantially disk shape being stacked. In the first damping check valve 413, a through hole is formed in a center of respective metal plates, and the later-described shaft portion 442 of the base member 440 is inserted into the through holes. Then, the first damping check valve 413 blocks the first extension-side flow path 411c and opens the first compression-side flow path 411b.

The O-ring 414 seals a gap between the first flow-path forming member 411 and the third side surface 129a of the axle holder 120. Then, the O-ring 414 blocks circulation of working oil through the gap between the outer periphery of the first flow-path forming member 411 and the third side surface 129a.

(Structure of Second Valve Unit 420)

As shown in FIG. 5, the second valve unit 420 includes a second flow-path forming member 421 forming a flow path of fluid for generating damping force, a second damping valve 422 arranged at an end portion in the base end side of the second flow-path forming member 421 and opening/closing the flow path in the base end side of the second flow-path forming member 421 in accordance with the flow of fluid, a second damping check valve 423 provided at an end portion in a leading end side of the second flow-path forming member 421, and an O-ring 424 provided interposed between the second flow-path forming member 421 and the third side surface 129a.

The second flow-path forming member 421 is a member formed in a thick-walled substantially cylindrical shape so that an outer diameter is approximately equal to the inner diameter of the third side surface 129a. Additionally, in the second flow-path forming member 421, there are formed a through hole 421a formed in the intersecting direction, into which the later-described shaft portion 442 of the base member 440 is inserted, a second compression-side flow path 421b configured by a through hole formed in the intersecting direction at a portion outer than the through hole 421a in a radial direction, and a second extension-side flow path 421c configured by a through hole formed in the intersecting direction. Furthermore, in the second flow-path forming member 421, there are formed an oil path 421d formed extended in a radial direction at an end portion in the base end side as well as communicated to the second compression-side flow path 421b and an oil path 421e formed extended in the radial direction at an end portion in the leading end side as well as communicated to the second extension-side flow path 421c. A plurality of (for example, three) second compression-side flow paths 421b and second extension-side flow paths 421c are respectively formed in a circumferential direction at equal intervals, which function as communication paths communicating between a second oil chamber 62 and the intermediate oil chamber 63.

The second damping valve 422 is formed by plural metal plates having a substantially disk shape being stacked. In the second damping valve 422, a through hole is formed in a center of respective metal plates, and the later-described shaft portion 442 of the base member 440 is inserted into the through holes. Then, the second damping valve 422 opens the second compression-side flow path 421b and blocks the second extension-side flow path 421c.

The second damping check valve 423 is formed by plural metal plates having a substantially disk shape being stacked. In the second damping check valve 423, a through hole is formed in a center of respective metal plates, and the later-described shaft portion 442 of the base member 440 is inserted into the through holes. Then, the second damping check valve 423 blocks the second compression-side flow path 421b and opens the second extension-side flow path 421c.

The O-ring 424 seals a gap between the second flow-path forming member 421 and the third side surface 129a of the axle holder 120. Then, the O-ring 424 blocks circulation of working oil through the gap between the outer periphery of the second flow-path forming member 421 and the third side surface 129a.

(Structure of Intermediate Member 430)

As shown in FIG. 5, the intermediate member 430 is a substantially cylindrical member and formed so that an inner diameter is larger than an outer diameter of the later-described shaft portion 442 of the base member 440, into which the shaft portion 442 is inserted. Then, a plurality of (for example, six) side holes 431 as through holes in the radial direction are formed in the circumferential direction at equal intervals so as to communicate between the inside and the outside.

(Structure of Base Member 440)

The base member 440 has a bottomed cylindrical shape, as shown in FIG. 5, including an accommodating portion 441 accommodating a later-described operation portion 500 and a cylindrical shaft portion 442 protruding from an end portion in the base end side of the accommodating portion 441 to the base end side.

In a central portion on a bottom of the accommodating unit 441, a through hole 441a in the intersecting direction is formed so as to communicate between an inside of the accommodating portion 441 and an inside of the shaft portion 442. In a side portion of the accommodating portion 441, a through hole 441b in the radial direction is formed so as to communicate between an inside and an outside of the accommodating portion 441. On an outer peripheral surface of the accommodating portion 441, there is formed a male screw 441c to be screwed into a female screw 474a formed in a later-described holding member 472 of the cap 470. Then, the later-described operation unit 500 is accommodated inside the accommodating portion 441.

At an end portion in the base end side of the shaft portion 442, a male screw 443 screwed to a nut 445 is formed. An inner diameter of the shaft portion 442 varies in stages, and an inner diameter of a base-end side inner peripheral portion 442a as an inner periphery of the end portion in the base end side is smaller than an inner diameter of a leading-end side inner peripheral portion 442b as an inner periphery of the end portion in the leading end side. An inclined portion 442c in which an inner diameter gradually varies is provided between the base-end side inner peripheral portion 442a and the leading-end side inner peripheral portion 442b. A plurality of (for example, six) side holes 442d as through holes in the radial direction are formed in the shaft portion 442 in the circumferential direction at equal intervals.

As described above, the first valve unit 410 has the O-ring 414 sealing the gap between the first flow-path forming member 411 and the third side surface 129a of the axle holder 120, and the second valve unit 420 has the O-ring 424 sealing the gap between the second flow-path forming member 421 and the third side surface 129a, thereby sectioning a space inside the first-intersecting direction concave portion 127, the second-intersecting direction concave portion 128 and the third-intersecting direction concave portion 129 into three subspaces. That is, the space is sectioned into the first oil chamber 61 as a subspace closer to the base-end side than a portion sealed by the O-ring 414 of the first valve unit 410, the second oil chamber 62 as a subspace closer to the leading end side than a portion sealed by the O-ring 424 of the second valve unit 420 and the intermediate oil chamber 63 as a subspace closer to the leading end side than the portion sealed by the O-ring 414 of the first valve unit 410 as well as closer to the base-end side than the portion sealed by the O-ring 424 of the second valve unit 420.

Then, the first oil chamber 61 is communicated to the lower oil chamber 51 through the base-end side communicating hole 132 formed in the axle holder 120, and the second oil chamber 62 is communicated to the annular oil chamber 53 through the leading end-side communicating hole 133 formed in the axle holder 120. The intermediate oil chamber 63 is communicated to the inside of the protruding portion 130 of the axle holder 120 through the central communicating hole 134 formed in the axle holder 120.

When the first valve unit 410, the second valve unit 420, the intermediate member 430 and so on are attached to the base member 440, phases are adjusted between the side holes 442d formed in the shaft portion 442 of the base member 440 and the side holes 431 formed in the intermediate member 430. Therefore, the inside of the shaft portion 442 of the base member 440 is communicated to the intermediate oil chamber 63.

As described above, the damping force generating portion 400 forms an external flow path for circulating working oil in the lower oil chamber 51 and the annular oil chamber 53 in the outside of the inner tube 110. The base-end side communicating hole 132, the leading end side communicating hole 133 and so on function as a part of the external flow path.

(Structure of Pressurization Portion 450)

As shown in FIG. 2, the pressurization portion 450 includes the thin-walled cylindrical space forming member 451 screwed into the female screw 131 formed in the protruding portion 130 of the circulation portion 123 in the axle holder 120 and forming a space inside, a cap 452 covering an upper end portion of the space forming member 451 and a free piston 453 arranged inside the space forming member 451 as well as sectioning a space inside the space forming member 451. The pressurization portion 450 also includes a stopper ring 454 preventing the cap 452 from falling off from the space forming member 451 as shown in FIG. 2.

The space forming member 451 is a thin-walled cylindrical member, in which the male screw 451a to be screwed into the female screw 131 formed in the protruding portion 130 of the axle holder 120 is formed in an end portion (lower end portion) in the axle holder 120 side. Also in the space forming member 451, there is formed a ring groove 451b which is concave from an inner peripheral surface, and the stopper ring 454 is fitted to the ring groove 451b.

The cap 452 is a substantially cylindrical member, in which a ring groove 452a to be concave from an outer peripheral surface is formed in a central portion in the axial direction, and an O-ring 452b is fitted to the ring groove 452a. Moreover, a sealing member 452c for preventing leakage of filled gas through an inside hole is fitted to an inside of the cap 452. The stopper ring 454 prevents the cop 452 from falling off from the inside of the space forming member 451 as described later. Then, the space forming member is held in an airtight manner.

The free piston 453 is a substantially columnar member, in which an O-ring groove 453a and a piston ring groove 453b are formed to be concave from an outer peripheral surface in an outer peripheral portion, and an O-ring 453c is fitted to the O-ring groove 453a and a piston ring 453d is fitted to the piston ring groove 453b. Then, the O-ring 453c fitted to the free piston 453 is compressed from the O-ring groove 453a and the inner peripheral surface of the space forming member 451, thereby sectioning the space inside the space forming member 451 into a pressurization chamber 71 positioned upper than the O-ring 453c and filled with gas to pressurize the free piston 453 and an oil reservoir chamber 72 positioned lower than the O-ring 453c and storing working oil.

The oil reservoir chamber 72 is communicated to the intermediate oil chamber 63 through the central communicating hole 134 formed in the axle holder 120. Therefore, the oil reservoir chamber 72 is pressurized through the free piston 453 by the gas filled in the pressurization chamber 71, and the working oil in the intermediate oil chamber 63, the lower oil chamber 51 and the annular oil chamber 53 is pressurized.

The stopper ring 454 is a ring-shaped member formed so that an outer diameter is larger than a diameter of an inner peripheral surface of the space forming member 451, and an inner diameter is smaller than a diameter of the inner peripheral surface of the space forming member 451 and the outer diameter of the cap 452. After the cap 452 is inserted into the space forming member 451, the stopper ring 454 is fitted to the ring groove 451b formed in the space forming member 451, thereby preventing the cap 452 from falling off from the space forming member 451.

(Structure of Damping Force Adjusting Portion 460)

The damping force adjusting portion 460 includes, as shown in FIG. 5, a first adjusting portion 480 as an example of a first adjusting portion adjusting a circulation amount of working oil circulating between the first oil chamber 61 and the intermediate oil chamber 63 through the inside of the shaft portion 442 of the base member 440, a second adjusting portion 490 as an example of a second adjusting portion adjusting a circulation amount of working oil circulating between the second oil chamber 62 and the intermediate oil chamber 63, and the operation portion 500 operating the adjustment of the first adjusting portion 480 and the second adjusting portion 490.

The first adjusting portion 480 includes a columnar portion 481 having a columnar shape and a conical portion 482 having a conical shape provided in an end portion of the base end side in the columnar portion 481. A flange portion 481a is provided near an end position of a leading end side of the columnar portion 481.

The second adjusting portion 490 is a portion having a substantially cylindrical shape, which is formed so that an inner diameter is larger than an outer diameter of the first columnar portion 481, into which the first adjusting portion 480 is inserted, and an end portion in the base end side is tapered so that an outer diameter is decreased toward the base end side. The second adjusting portion 490 according to the embodiment is integrally provided with a later-described second adjust nut 521. However, the second adjusting portion 490 may be separately formed from the second adjust nut 521.

As shown in FIG. 5, the operation unit 500 includes a first operation portion 510 moving the first adjusting portion 480 to the intersecting direction and a second operation portion 520 moving the second adjusting portion 490 to the intersecting direction. The first operation portion 510 and the second operation portion 520 are accommodated in a space chiefly formed by the accommodating portion 441 of the base member 440 and the cap 470.

The first operation portion 510 includes a first adjust nut 511 applying a force in the intersecting direction to the first adjusting portion 480 and a first adjust bolt 512 fitted to a female screw 511a formed in the first adjust nut 511 as well as moving the first adjust nut 511 in the intersecting direction.

The second operation portion 520 includes a second adjust nut 521 applying a force in the intersecting direction to the second adjusting portion 490 and a second adjust bolt 522 fitted to a female screw 521a formed in the second adjust nut 521 as well as moving the second adjust nut 521 in the intersecting direction.

The first adjust nut 511 is a disk-shaped member having an outer diameter slightly smaller than an inner diameter of the accommodating portion 441 of the base member 440, in which the female screw 511a to which the first adjust bolt 512 is fitted and a through hole 511b for inserting a later-described third columnar portion 522c of the second adjust bolt 522 are formed. In a center of the first adjust nut 511, a through hole for inserting the columnar portion 481 of the first adjusting portion 480 is formed. Then, on an end surface in a leading end side of the first adjust nut 511, a snap ring 511c fitted to a groove formed in the columnar portion 481 of the first adjusting portion 480 to prevent the first adjusting portion 480 from moving up and down with respect to the first adjust nut 511 is attached.

The first adjust bolt 512 is a member in which plural columnar portions having different outer diameters are aligned in the intersecting direction. More specifically, the first adjust bolt 512 includes a first columnar portion 512a provided in an upper end portion, a second columnar portion 512b provided closer to the base end side than the first columnar portion 512a and having an larger outer diameter than an outer diameter of the first columnar portion 512a, a third columnar portion 512c provided closer to the base end side than the second columnar portion 512b and having a smaller outer diameter than an outer diameter of the second columnar portion 512b and a fourth columnar portion 512d provided closer to the base end side than the third columnar portion 512c and having a smaller outer diameter than the outer diameter of the third columnar portion 512c.

On an outer peripheral surface of the first columnar portion 512a, a ring groove 512e is formed therearound so as to be concave to an inside from the outer peripheral surface, and an O-ring 512f is fitted to the ring groove 512e. On an end surface in the leading end side of the first columnar portion 512a, a concave portion 512g is formed to be concave from the end surface to the base end side.

The outer diameter of the second columnar portion 512b is larger than an inner diameter of a through hole formed in a columnar portion 473 of the holding member 472 of the cap 470.

On an outer peripheral surface of the third columnar portion 512c, there is formed a male screw 512h fitted to the female screw 511a formed in the first adjust nut 511.

The second adjust nut 521 is a disk-shaped member having a slightly smaller outer diameter than the inner diameter of the accommodating portion 441 of the base member 440, in which the female screw 521a to which the second adjust bolt 522 is fitted and a through hole 521b for inserting the fourth columnar portion 512d of the first adjust bolt 512 are formed. In a central portion of the second adjust nut 521, a through hole for inserting the columnar portion 481 of the first adjusting portion 480 is formed. Then, the second adjusting portion 490 is integrally formed on an end surface of the base end side in the second adjust nut 521.

The second adjust bolt 522 is a member in which plural columnar portions having different outer diameters are aligned in the intersecting direction. More specifically, the second adjust bolt 522 includes a first columnar portion 522a provided in an end portion of the leading end side, a second columnar portion 522b provided closer to the base end side than the first columnar portion 522a and having an larger outer diameter than an outer diameter of the first columnar portion 522a, the third columnar portion 522c provided closer to the base end side than the second columnar portion 522b and having a smaller outer diameter than an outer diameter of the second columnar portion 522b and a fourth columnar portion 522d provided closer to the base end side than the third columnar portion 522c and having a smaller outer diameter than the outer diameter of the third columnar portion 522c.

On an outer peripheral surface of the first columnar portion 522a, a ring groove 522e is formed therearound so as to be concave to an inside from the outer peripheral surface, and an O-ring 522f is fitted to the ring groove 522e. On an end surface in the leading end side in the first columnar portion 522a, a concave portion 522g is formed so as to be concave from the end surface to the base end side.

The outer diameter of the second columnar portion 522b is larger than an inner diameter of a through hole formed in the columnar portion 473 of the holding member 472 of the cap 470.

The outer diameter of the third columnar portion 522c is smaller than an inner diameter of the through hole 511b formed in the first adjust nut 511.

On an outer peripheral surface of the fourth columnar portion 522d, a male screw 522h fitted to the female screw 521a formed in the second adjust nut 521 is formed.

(Structure of Cap 470)

The cap 470 includes a cap base 471 as a base and the holding member 472 holding the base member 440 as shown in FIG. 5.

The cap base 471 is a cylindrical member, having a flange portion 471a at an end portion in the leading end side, which is formed so that an outer diameter is larger than an opening of the first-intersecting direction concave portion 127 of the axle holder 120. That is, the flange portion 471a contacts the leading end surface 123a of the axle holder 120. In the cap base 471, a ring groove 471b is formed to be concave from an outer peripheral surface at a portion close to the base end side than the flange portion 471a, and an O-ring 471c is fitted to the ring groove 471b. Also in the cap base 471, there is formed a male screw 471d to be screwed into a female screw 123b formed in the axle holder 120 on the outer peripheral surface at a portion close to the base end side than the ring groove 471b. The cap base 471 is also provided with a protruding portion 471e protruding toward an inside from an inner peripheral surface at an end portion in the base end side.

The holding member 472 includes the columnar portion 473 having a columnar shape, a base-end side cylindrical portion 474 having a cylindrical shape, which protrudes to the base end side from an end portion of the base end side in the columnar portion 473, and a leading end-side cylindrical portion 475 having a cylindrical shape, which protrudes to the leading end side from an end portion of the leading end side in the columnar portion 473.

In the columnar portion 473, there are formed a through hole in the intersecting direction into which the first columnar portion 512a of the first adjust bolt 512 is inserted and a through hole in the intersecting direction into which the first columnar portion 522a of the second adjust bolt 522 is inserted. In an outer peripheral portion of the columnar portion 473, a ring groove 473a is formed to be concave from an outer peripheral surface, and an O-ring 473b is fitted to the ring groove 473a.

The female screw 474a to which the male screw 441c formed in the accommodating portion 441 of the base member 440 is screwed is formed in an end portion of the base end side of the base-end side cylindrical portion 474.

Then, the holding member 472 holds the base member 440 by the male screw 441c formed in the base member 440 being screwed into the female screw 474a formed in the base-end side cylindrical portion 474. The holding member 472 also holds the cap base 471 by sandwiching the protruding portion 471e of the cap base 471 between the end portion of the base end side in the base-end side cylindrical portion 474 and the base member 440.

The operation portion 500 having the above structure is accommodated in the space chiefly formed by the accommodating portion 441 of the base member 440 and the cap 470. At that time, the first columnar portion 512a of the first adjust bolt 512 and the first columnar portion 522a of the second adjust bolt 522 are respectively inserted into the through holes formed in the columnar portion 473 of the holding member 472 in the cap 470.

Then, the first adjust nut 511 into which the first adjust bolt 512 is screwed is prevented from being rotated and moves in the intersecting direction by rotational operation of the first adjust bolt 512 as the third columnar portion 522c of the second adjust bolt 522 is fitted to the through hole 511b of the first adjust nut 511. According to the movement, the first adjusting portion 480 moves in the intersecting direction.

On the other hand, the second adjust nut 521 into which the second adjust bolt 522 is screwed is prevented from being rotated and moves in the intersecting direction by rotational operation of the second adjust bolt 522 as the fourth columnar portion 512d of the first adjust bolt 512 is fitted to the through hole 521b of the second adjust nut 521. According to the movement, the second adjusting portion 490 moves in the intersecting direction.

In the damping force adjusting portion 460 having the above structure, a flow amount of working oil from the first oil chamber 61 toward the intermediate oil chamber 63 through the inside of the shaft portion 442 of the base member 440 is adjusted by changing a flow path area by adjusting a position of the conical portion 482 of the first adjusting portion 480 with respect to the inclined portion 442c inside the shaft portion 442.

On the other hand, a flow amount of working oil from the second oil chamber 62 toward the intermediate oil chamber 63 through the inside of the shaft portion 442 of the base member 440 is adjusted by changing the flow path area by adjusting a position of the second adjusting portion 490 with respect to the leading-end side inner peripheral portion 442b inside the shaft portion 442.

(Operation of Damping Force Generating Portion 400)

Figure 6B:
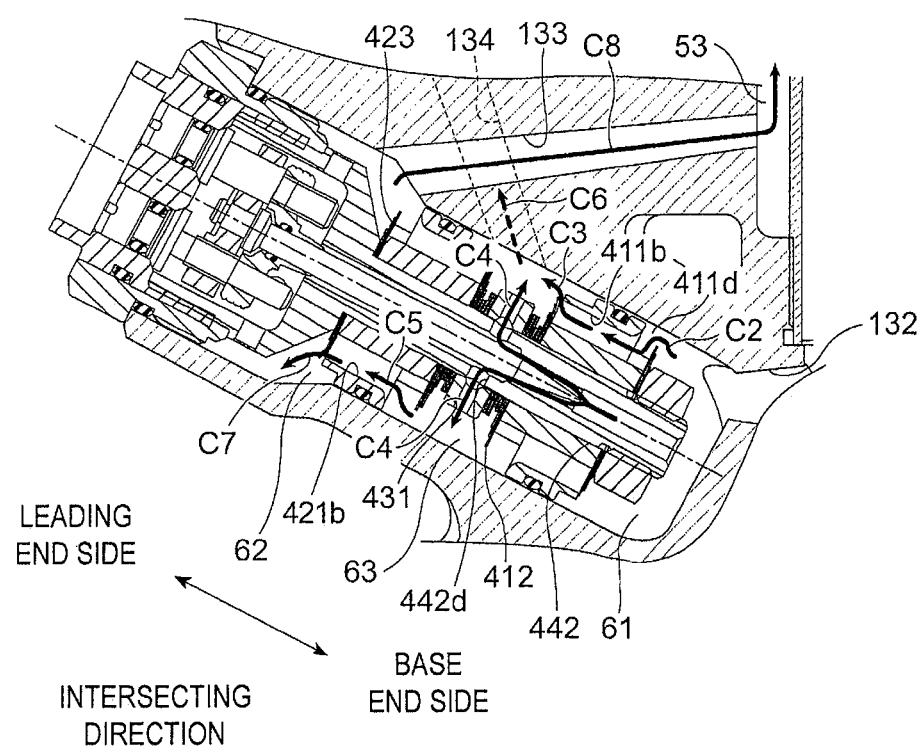
Figure 7B:
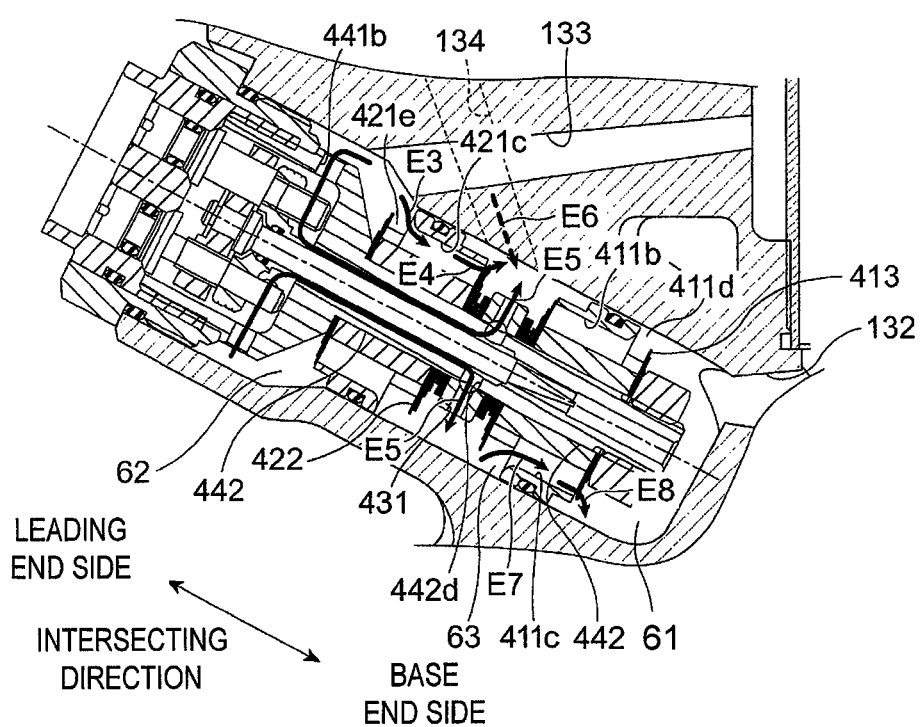

FIG. 6A, FIG. 6B, FIG. 7A and FIG. 7B are views for explaining operation of the damping force generating portion 400. FIGS. 6A and 6B shows the flow of working oil in the damping force generating portion 400 in the case of a compression side stroke in which the piston 200 held in the lower end portion of the piston rod 230 moves downward, and FIG. 7A and FIG. 7B are views showing the flow of working oil in the damping force generating portion 400 in the case of an extension side stroke in which the piston 220 moves upward.

(Compression Side Stroke)

In the compression side stroke, as shown in FIG. 6A, when the piston 220 moves downward, a pressure of working oil in the lower oil chamber 51 is increased by the movement of the piston 220. The working oil in the lower oil chamber 51 flows to the first oil chamber 61 through the base-end side communicating hole 132 as shown by an arrow C1 in FIG. 6A.

Then, the working oil which has flowed to the first oil chamber 61 flows from the oil path 411d to the first compression-side flow path 411b of the first flow-path forming member 411 as shown by an arrow C2 in FIG. 6B. Furthermore, the working oil which has flowed to the first compression-side flow path 411b flows to the intermediate oil chamber 63 while opening the first damping valve 412 by bending the valve to the leading end side as shown by an arrow C3. A compression-side damping force is generated by resistance of interfering with the flow of the working oil by the first damping valve 412.

On the other hand, the working oil which has flowed to the first oil chamber 61 flows to the intermediate oil chamber 63 through the inside of the shaft portion 442 of the base member 440, the side holes 442d and the side holes 431 as shown by arrows C4 in FIG. 6B. The inside of the shaft portion 442, the side holes 442d and the side holes 431 function as an example of a first bypass flow path reaching the intermediate oil chamber 63 from the lower oil chamber 51 while bypassing the first compression-side flow path 411b.

The working oil which has flowed to the intermediate oil chamber 63 through the first compression-side flow path 411b and the working oil which has flowed to the intermediate oil chamber 63 through the inside of the shaft portion 442 of the base member 440 join, and then the working oil is separated to the flow toward the second compression-side flow path 421b shown by an arrow C5 in FIG. 6B and the flow toward the oil reservoir chamber 72 through the central communicating hole 134 shown by an arrow C6 in FIG. 6B in the intermediate oil chamber 63.

Then, the working oil which has flowed to the second compression-side flow path 421b flows to the second oil chamber 62 while opening the second damping check valve 423 by bending the valve to the leading end side as shown by an arrow C7.

Then, the working oil which has flowed to the second oil chamber 62 flows to the annular oil chamber 53 through the leading end-side communicating hole 133 as shown by an arrow C8 in FIG. 6A.

Furthermore, the working oil which has flowed to the annular oil chamber 53 flows to the upper oil chamber 52 through the communicating hole 142c formed in the forming member 140 as shown by an arrow C9 in FIG. 6A.

(Extension Side Stroke)

In the extension side stroke, as shown in FIG. 7A, when the piston 220 moves upward, the pressure of working oil in the upper oil chamber 52 is increased by the movement of the piston 220. The working oil in the upper oil chamber 52 flows to the annular oil chamber 53 through the communicating hole 142c formed in the forming member 140 as shown by an arrow E1 in FIG. 7A.

Then, the working oil which has flowed to the annular oil chamber 53 flows to the second oil chamber 62 through the leading end-side communicating hole 133 as shown by an arrow E2 in FIG. 7A.

Then, the working oil which has flowed to the second oil chamber 62 flows from the oil path 421e to the second extension-side flow path 421c of the second flow-path forming member 421 as shown by an arrow E3 in FIG. 7B. Furthermore, the working oil which has flowed to the second extension-side flow path 421c flows to the intermediate oil chamber 63 while opening the second damping valve 422 by bending the valve to the base end side as shown by an arrow E4 in FIG. 7B. An extension-side damping force is generated by resistance of interfering with the flow of the working oil by the second damping valve 422.

On the other hand, the working oil which has flowed to the second oil chamber 62 flows to the intermediate oil chamber 63 through the through hole 441b formed in the accommodating portion 441 of the base member 440, the inside of the shaft portion 442, the side holes 442d and the side holes 431 as shown by arrows E5 in FIG. 7B. The through hole 441b, the inside of the shaft portion 442, the side holes 442d and the side holes 431 function as an example of a second bypass flow path reaching the intermediate oil chamber 63 from the upper oil chamber 52 while bypassing the second extension-side flow path 421c.

The working oil which has flowed to the intermediate oil chamber 63 through the second extension-side flow path 421c, the working oil which has flowed to the intermediate oil chamber 63 through the inside of the shaft portion 442 of the base member 440 and the working oil which has flowed to the intermediate oil chamber 63 from the oil reservoir chamber 72 through the central communicating hole 134 shown by an arrow E6 in FIG. 7B join, and then flow toward the first extension-side flow path 411c as shown by an arrow E7 in FIG. 7B.

Then, the working oil which has flowed to the first extension-side flow path 411c flows to the first oil chamber 61 while opening the first damping check valve 413 by bending the valve to the base end side as shown by an arrow E8 in FIG. 7B.

Then, the working oil which has flowed to the first oil chamber 61 flows to the lower oil chamber 51 through the base-end side communicating hole 132 as shown by an arrow E9 in FIG. 7A.

Furthermore, in the compression side stroke, a capacity of the lower oil chamber 51 is compressed and a capacity of the upper oil chamber 52 is expanded by the piston 220 being moved downward as shown in FIG. 6A. On the other hand, the capacity of the lower oil chamber 51 is expanded and the capacity the upper oil chamber 52 is compressed by the piston 220 being moved upward. In such cases, an amount of the working oil corresponding to a displacement capacity caused by the movement of the piston rod 230 (cross section area of the piston rod 230×displacement amount) enters/exits to and from the oil reservoir chamber 72 through the central communicating hole 134. Additionally, the volume of the working oil which has changed due to the temperature at the time of operation is compensated in the oil reservoir chamber 72.

In a process in which working oil in the lower oil chamber 51 flows to the upper oil chamber 52 in the compression side stroke and in a process in which working oil in the upper oil chamber 52 flows to the lower oil chamber 51 in the extension side stroke, the damping force is generated when the working oil passes through a gap between the outer peripheral surface of the intermediate member 150 and the inner peripheral surface of the inner tube 110. As the flow-path area between the outer peripheral surface of the intermediate member 150 and the inner peripheral surface of the inner tube 110 can be changed by changing an outer diameter of the outer peripheral surface of the intermediate member 150, the damping force can be adjusted by changing the outer diameter of the outer peripheral surface of the intermediate member 150 in accordance with specifications. However, it is also preferable that a shape not causing the damping force (throttle) is applied to an outer peripheral shape of the intermediate member 150 as a pressure balance may be adversely affected in the ease where the damping force is generated when the working oil flows in the gap between the outer peripheral surface of the intermediate member 150 and the inner peripheral surface of the inner tube 110.

In the front fork 21 according to the embodiment constructed as described above, the damping force generating portion 400 exists outside the inner tube 110 and the outer tube 210, and flow paths for generating damping force are not formed in the piston 220 moving inside the inner cylinder 135 in the axial direction, therefore, the stable pressure balance not dependent on a piston speed and damping specifications can be realized, as a result, a stable feeling of damping force can be obtained.

In the front fork 21 according to the embodiment, the forming member 140 defines the working oil chamber 41 and the air chamber 42, and the pressure of working oil is not dependent on a pressure of the air chamber 42. Therefore, the stable pressure balance not dependent on the pressure of the air chamber 42 can be realized and the stable feeling of damping force can be obtained.

Accordingly, the feeling of damping force can be improved by the front fork 21 according to the embodiment as compared with an apparatus not applying such structure. As a result, riding comfort and driving stability of the motorcycle 1 can be improved.

Also in the front fork 21 according to the embodiment, working oil is stored in all a space below the piston 220 in the inner cylinder 135. The working oil contributes to the generation of damping force at the time of the compression side stroke. Therefore, when applying the front fork 21 according to the embodiment, an amount of working oil contributing to the generation of damping force is increased as compared with apparatuses having a structure in which it is difficult to store working oil in all the space below the piston 220 in the inner cylinder 135 and a structure in which all the working oil stored in the space below the piston 220 in the inner cylinder 135 does not contribute to the generation of damping force. As a result, a variable range of damping force can be widely set.

Also in the front fork 21 according to the embodiment, as the damping force generating portion 400 exists outside the inner tube 110 and the outer tube 210, replacement of parts concerning damping specifications such as the first valve unit 410 and the second valve unit 420 can be easily performed without disassembling a fitting between the inner tube 110 and the outer tube 210, therefore, an adjustment of damping force can be performed quickly.

Furthermore, in the front fork 21 according to the embodiment, as the working oil stored in the oil reservoir chamber 72 is pressurized by the gas filled in the pressurization chamber 71, the working oil generating the damping force has the same pressure as the pressure of the pressurization chamber 71, therefore, positive pressure is constantly maintained. Accordingly, it is possible to suppress occurrence of cavitation in the working oil chamber 41 and the intermediate oil chamber 63.

What is claimed is:

1. A front fork comprising:
   cylindrical two tubes arranged so as to be coaxial to each other and relatively moving with respect to each other in an axial direction;
   an axle holder covering an opening in a lower side of an inner tube as the tube protruding downward in the two tubes;
   a tubular inner cylinder attached to the axle holder so as to be arranged inside the inner tube;
   a forming member arranged in an upper part of the inner cylinder and forming a working oil chamber in which working oil is filled in an inner space of the inner tube;
   a penetrating member a part of which penetrates the forming member to enter the working oil chamber, relatively moving with respect to the inner tube with an outer tube as the tube protruding upward in the two tubes;
   a sectioning member attached to a lower end portion of the penetrating member and sectioning the working oil chamber in the inner cylinder into an upper oil chamber positioned in an upper part and a lower oil chamber positioned in a lower part;
   a communicating portion communicating the upper oil chamber to an outer oil chamber as an oil chamber formed between an inner peripheral surface of the inner tube and an outer peripheral surface of the inner cylinder; and a damping force generating portion forming an external flow path for circulating working oil to the lower oil chamber and the outer oil chamber at an outside of the inner tube, wherein the damping force generating portion includes;
- a first damping force generating portion generating resistance in working oil flowing in one direction in the external flow path to generate damping force,
- a second damping force generating portion disposed in series with the first damping force generating portion in the external flow path to generate resistance in working oil flowing in the other direction in the external flow path to generate damping force,
- an intermediate oil chamber formed between the first damping force generating portion and the second damping force generating portion,
- a pressurization portion having an oil reservoir chamber communicated to the intermediate oil chamber and pressurizing working oil in the intermediate oil chamber by working oil filled in the oil reservoir chamber,
- a compression side flow path in which working oil in the lower oil chamber flows toward the upper oil chamber through the external flow path in a compression side stroke, and
- a first bypass flow path reaching the intermediate oil chamber from the lower oil chamber while bypassing the compression side flow path, wherein working oil flowing through the compression side flow path and working oil through the first bypass flow path join at the intermediate oil chamber and a part of the joined oil flows into the oil reservoir chamber and another part of the joined oil flows into the upper oil chamber.

2. The front fork according to claim 1,
wherein
a compression side damping valve is provided on an upstream side of the compression side flow path,
a compression side check valve is provided in a downstream side of the compression side flow path, and
an intermediate portion between the compression side damping valve and the compression side check valve in the compression side flow path is communicated to the oil reservoir chamber, and
wherein an extension side flow path in which working oil in the upper oil chamber flows toward the lower oil chamber through the external flow path in an extension side stroke is provided in the damping force generating portion,
an extension side damping valve is provided on an upstream side of the extension side flow path,
an extension side check valve is provided in a downstream side of the extension side flow path, and
an intermediate portion between the extension side damping valve and the extension side check valve in the extension side flow path is communicated to the oil reservoir chamber.

3. The front fork according to claim 2,
wherein the damping force generating portion includes;
a first adjusting portion adjusting a flow amount of working oil flowing to the first bypass flow path,
a second bypass flow path reaching the intermediate oil chamber from the outer oil chamber while bypassing the extension side flow path, and a second adjusting portion adjusting a flow amount of working oil flowing to the second bypass flow path.

4. The front fork according to claim 2, wherein working oil flowing through the extension side flow path and working oil flowing through the second bypass flow path join at the intermediate oil chamber, and a part of the joined working oil flows into the lower oil chamber.

5. The front fork according to claim 1, wherein the damping force generating portion further includes a hollow shaft through which working oil flows along the first bypass flow path, the hollow shaft having a first end that is always open for receiving the working oil.

6. The front fork according to claim 5, wherein
an inside diameter of the hollow shaft has a first portion defined by a first diameter and a second portion defined by a second diameter which is less than the first diameter;
the hollow shaft includes an inclined portion provided between the first and second portions inside the hollow shaft;
the damping force generating portion further includes a movable first adjusting portion received inside the hollow shaft, wherein a position of the moveable first adjusting portion relative to the inclined portion regulates the flow of the working oil along the first bypass flow path; and
the movable first adjusting portion has a conical portion at one end thereof and positioned proximate to the inclined portion.

7. The front fork according to claim 5, wherein the hollow shaft includes a longitudinal axis that passes therethrough and a plane parallel to the longitudinal axis that intersects:
(1) a central communicating hole that carries the joined working oil from the intermediate oil chamber to the oil reservoir chamber, and
(2) a leading end-side communicating hole that carries the joined working oil from the intermediate oil chamber to the upper oil chamber.

8. The front fork according to claim 1, further comprising:
a coil spring that is guided by a coil spring guide, which is disposed around the penetrating member in a longitudinal direction,
wherein an outer surface of the penetrating member is in direct contact with the coil spring guide along a length thereof so as prevent a space from being formed between the outer surface of the penetrating member and the coil spring guide.

9. A front fork comprising:
cylindrical two tubes arranged so as to be coaxial to each other and relatively moving with respect to each other in an axial direction;
an axle holder covering an opening in a lower side of an inner tube as the tube protruding downward in the two tubes;
a tubular inner cylinder attached to the axle holder so as to be arranged inside the inner tube;
a forming member arranged in an upper part of the inner cylinder and forming a working oil chamber in which working oil is filled in an inner space of the inner tube;
a penetrating member a part of which penetrates the forming member to enter the working oil chamber, relatively moving with respect to the inner tube with an outer tube as the tube protruding upward in the two tubes;
a sectioning member attached to a lower end portion of the penetrating member and sectioning the working oil chamber in the inner cylinder into an upper oil chamber positioned in an upper part and a lower oil chamber positioned in a lower part;

a communicating portion communicating the upper oil chamber to an outer oil chamber as an oil chamber formed between an inner peripheral surface of the inner tube and an outer peripheral surface of the inner cylinder; and a damping force generating portion forming an external flow path for circulating working oil to the lower oil chamber and the outer oil chamber at an outside of the inner tube, wherein the damping force generating portion includes;

a first damping force generating portion generating resistance in working oil flowing in one direction in the external flow path to generate damping force, a second damping force generating portion disposed in series with the first damping force generating portion in the external flow path to generate resistance in working oil flowing in the other direction in the external flow path to generate damping force, an intermediate oil chamber formed between the first damping force generating portion and the second damping force generating portion, a pressurization portion having an oil reservoir chamber communicated to the intermediate oil chamber and pressurizing working oil in the intermediate oil chamber by working oil filled in the oil reservoir chamber, a compression side flow path in which working oil in the lower oil chamber flows toward the upper oil chamber through the external flow path in a compression side stroke, a first bypass flow path reaching the intermediate oil chamber from the lower oil chamber while bypassing the compression side flow path, and a hollow shaft through which working oil flows along the first bypass flow path, wherein working oil flowing through the compression side flow path and working oil flowing through the first bypass flow path join at the intermediate oil chamber and a part of the joined oil flows into the oil reservoir chamber and another part of the joined oil flows into the upper oil chamber, and the hollow shaft includes a longitudinal axis that passes therethrough and a plane parallel to the longitudinal axis that intersects:

(1) a central communicating hole that carries the joined working oil from the intermediate oil chamber to the oil reservoir chamber, and (2) a leading end-side communicating hole that carries the joined working oil from the intermediate oil chamber to the upper oil chamber.

\* \* \* \* \*